Patented Feb. 10, 1948

2,435,773

UNITED STATES PATENT OFFICE 2,435,773

BUTADIENE-ACRYLONITRILE COPOLYMER PLASTICIZED WITH ISOBUTYL BETA ISOBUTOXY PROPIONATE

Albert M. Clifford and Joy G. Lichty, Stow, Ohio, assignors to Wingfoot Corporation, Akron, Ohio, a corporation of Delaware No Drawing. Application November 12, 1943, Serial No. 510,034

1 Claim. (Cl. 260—36)

This invention relates to a plasticized, synthetic rubber and is particularly suited for use in compounds which are to be used at very low temperatures. The plasticizer is an alkyl ester of a beta alkoxy propionic acid. The preferred plasticizer is isobutyl beta isobutoxy propionate. When used to plasticize a synthetic rubber which is essentially composed of butadiene and acrylonitrile, it has been found to give a plasticized product which remains flexible at very low temperatures.

The following examples illustrate the invention. The compounding formulae are first given. The various materials are given in parts by weight. Following the respective formulae are tables showing the testing data acquired in the usual manner from rubber compounded according to the preceding formulae. The tensile and modulus values below are given in kilograms per square centimeter which may be converted to pounds per square inch by multiplying these values by the conversion factor 14.2.

Example 1

| | |
|---|---:|
| Copolymer | 110.0 |
| Zinc oxide | 1.0 |
| Sulfur | 0.1 |
| Gas black | 45.0 |
| Thermatonic black (made by thermal cracking natural gas) | 50.0 |
| Tetramethyl thiuram disulfide | 3.0 |
| Isobutyl beta isobutoxy propionate | 40.0 |

| Cure | Tensile | Elongation | Modulus—300% |
|---|---|---|---|
| 40 min./290° C | 102 | 405 | 66 |

When tested according to the usual cold test, the test sample was satisfactorily bent double at −40° C.

Example 2

| | |
|---|---:|
| Butadiene-1,3/acrylonitrile copolymer 60/40 | 110.0 |
| Zinc oxide | 1.0 |
| Sulfur | 0.1 |
| Gas black | 35.0 |
| Tetramethyl thiuram disulfide | 3.0 |
| Isobutyl beta isobutoxy propionate | 18.0 |

| Cure | Tensile | Elongation | Modulus—300% |
|---|---|---|---|
| 10 min./290° C | 42 | 885 | 10 |
| 20 min./290° C | 127 | 590 | 36 |
| 30 min./290° C | 121 | 495 | 47 |
| 40 min./290° C | 110 | 450 | 51 |
| 60 min./290° C | 110 | 440 | 53 |

Example 3

| | |
|---|---:|
| Copolymer | 110.0 |
| Zinc oxide | 1.0 |
| Sulfur | 0.1 |
| Gas black | 45.0 |
| Tetramethyl thiuram disulfide | 3.0 |
| Isoamyl beta isoamyloxy propionate | 23.0 |

| Cure | Tensile | Elongation | Modulus—300% |
|---|---|---|---|
| 20 min./290° C | 109 | 525 | 43 |
| 40 min./290° C | 118 | 480 | 51 |
| 60 min./290° C | 96 | 410 | 54 |

Example 4

| | |
|---|---:|
| Copolymer | 110.0 |
| Zinc oxide | 5.0 |
| Sulfur | 2.0 |
| Gas black | 75.0 |
| Benzothiazyl-2-diethylsulphenamide | 1.0 |
| Stearic acid | 1.0 |
| Isoamyl isoamyloxy propionate | 45.0 |

| Cure | Tensile | Elongation | Modulus—300% |
|---|---|---|---|
| 20 min./290° C | 96 | 475 | 46 |
| 40 min./290° C | 96 | 390 | 64 |
| 60 min./290° C | 94 | 355 | 72 |

The above formulae are merely illustrative. The ingredients and the amounts of each may be varied. The amount of plasticizer used may be varied over a wide range.

The alkyl groups, as will be seen, may contain from, for example, one to twelve carbon atoms. Different alkyl groups may occur in any of the compounds. The esters of this class are all good plasticizers for this rubber-like copolymer although the isobutyl ester of the isobutyl ether is preferred when the rubber material is to be used at real low temperatures.

What we claim is:

A rubber-like copolymer of butadiene and acrylonitrile plasticized with isobutyl beta isobutoxy propionate.

ALBERT M. CLIFFORD.
JOY G. LICHTY.

REFERENCES CITED

The following references are of record in the file of this patent:

UNITED STATES PATENTS

| Number | Name | Date |
|---|---|---|
| 2,010,154 | Hubacher | Aug. 6, 1935 |
| 2,051,877 | Marks | Aug. 25, 1936 |
| 2,245,233 | Smith | June 10, 1941 |
| 2,389,959 | Dean | Nov. 27, 1945 |

OTHER REFERENCES

Stocklin, Trans. Instit. Rubber Ind., vol. 15, pages 52 and 58, June 1939.

Hycar O. R. 15, Softener Study 2A, Sept. 1942, pages 6, 7 and 20.